(No Model.)
S. D. POOLE.
DRAFT EQUALIZER.
No. 527,074. Patented Oct. 9, 1894.
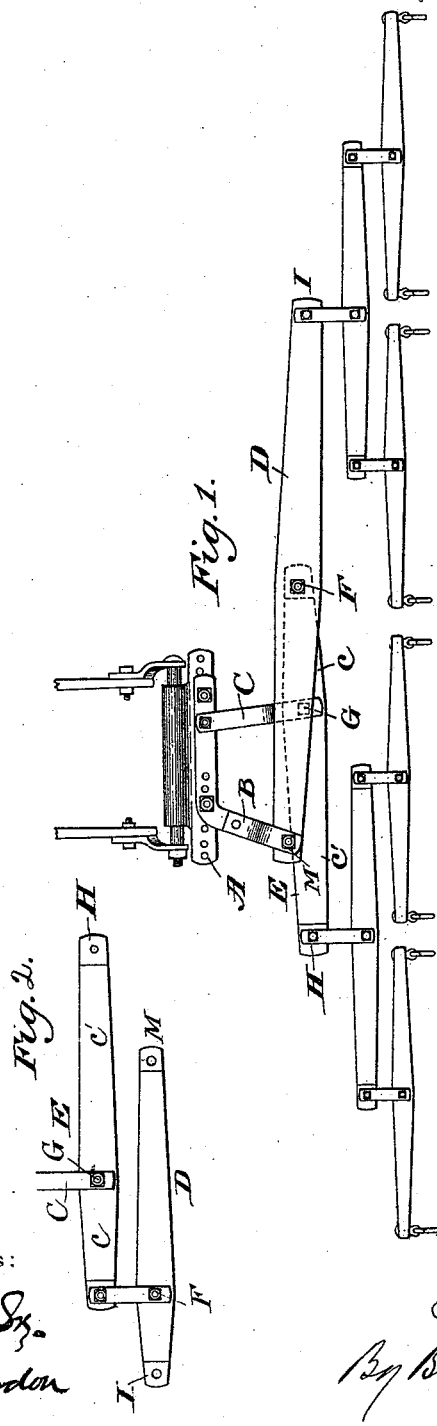
Witnesses:
T. A. Connor, Jr.
Chas. E. Reordon
Inventor.
Staley D. Poole
By Butterworth & Dowell
his Attorneys.

UNITED STATES PATENT OFFICE.

STALEY D. POOLE, OF MOLINE, ILLINOIS, ASSIGNOR TO THE DEERE & COMPANY, OF SAME PLACE.

DRAFT-EQUALIZER.

SPECIFICATION forming part of Letters Patent No. 527,074, dated October 9, 1894.

Application filed February 19, 1894. Serial No. 500,784. (No model.)

*To all whom it may concern:*

Be it known that I, STALEY D. POOLE, a citizen of the United States, residing at Moline, in the county of Rock Island and State of Illinois, have invented certain new and useful Improvements in Draft-Equalizers; and I do hereby declare the following to be a full, clear, and exact description of the invention, such as will enable others skilled in the art to which it appertains to make and use the same.

My invention relates to an improvement in that class of draft equalizers in which the point of connection between the vehicle or implement to be drawn and the draft devices is arranged at one side of the center of draft; and the object of the invention is to provide a simple and effective relative arrangement of the evener bars, whereby the required distribution of the leverage is obtained to insure equalization of draft.

The invention consists in the features of construction and relative arrangement of the evener bars, as hereinafter fully described and particularly defined in the appended claims.

In the accompanying drawings, forming a part of this specification, Figure 1 is a plan view of an evener embodying my invention with double-trees and draft attachments connected therewith; and Fig. 2 illustrates a modified arrangement of the evener bars.

A indicates the draft bars of a gang plow or other machine to which the horses are to be hitched.

B and C indicate arms projecting forwardly from the bar A and preferably secured to the clevis, as illustrated, to provide different adjustments of the arms. The evener bars D and E are attached to the end of these arms B and C as will now be described.

In the construction illustrated in Fig. 1, the lower bar E is pivotally secured at its inner end to the center F, of the upper bar D, and is attached to the outer end of the arm C at a point G, located at a distance from the inner end of the bar equal to one-third of the length of said bar, thus dividing the latter into a short arm $c$ and a long arm $c'$. The bar D is fulcrumed at its inner end to the arm B. The evener shown being a four horse evener with the horses attached in pairs, and presumably being equal in draft, the power at H will be equal to the power at I. If the lever E has a fulcrum at G, dividing the lever into two arms, the outer of which is double the length of the inner one, it is evident that the power applied at H will be doubled in exerting a pressure at F, or for two horses at H a four-horse resistance will be developed at F. This four-horse pressure at F will be resisted through the lever D by a two-horse pressure at I and the same at M, provided the arms I, F, and F, M, are equal. The theoretical conditions therefore for a four-horse equalizer of this construction are that the lever D shall be bisected at F, while the arm $c'$ must be twice as long as the arm $c$. If in practice the length of these levers is slightly changed because the loss by friction at the different points may not be exactly the same, or because the lever arms are not exactly homogeneous, or do not balance each other; such changes will be slight and the principles of its operation will not in the least be affected.

In Fig. 2 I have shown one lever set in front of the other instead of above the other, in order to more clearly illustrate the principle and operation of my equalizer. Here the evener bar E is not pivoted to the center of the evener bar D as in the preferred form, but at some predetermined point which may be one-third the distance between the points I and M of said lever, as illustrated. A two-horse pull at H in this case would equalize a three-horse pull at I.

It will be apparent that the variations in proportion between the two bars by the shifting of their respective fulcrum points need only be limited by the number of horses that can be practically employed together, and I therefore do not desire to confine myself to any special relative arrangement except as defined by the following claims.

Having thus fully described my invention, what I claim as new, and desire to secure by Letters Patent of the United States, is—

1. The combination with the draft bar arranged at one side of the center of the draft, of outwardly extending arms adjustably held upon said draft bar, an evener bar fulcrumed at its inner end upon one of said arms, and a second evener bar fulcrumed upon the end of the other arm at a point located at a predetermined distance from the inner end of said bar, the inner end of said second bar being pivotally secured at a central point to the first mentioned evener bar, substantially as described.

2. The combination with a pair of arms adapted to be secured to the clevis of a draft bar, of an evener bar fulcrumed at its inner end upon one of said arms, and a second evener bar fulcrumed at a point located at a predetermined distance from the inner end of said second bar, the inner end of said second bar being pivotally secured at a predetermined point to the first mentioned evener bar, substantially as described.

3. The combination with the draft bar arranged at one side of the center of the draft, of outwardly extending arms adjustably held upon said draft bar, an evener bar fulcrumed at its inner end upon one of said arms, and a second evener bar fulcrumed upon the end of the other arm at a point located at a predetermined distance from the inner end of said bar, the inner end of said second bar being pivotally secured at a predetermined point to the first mentioned evener bar, substantially as described.

In testimony whereof I affix my signature in presence of two witnesses

S. D. POOLE.

Witnesses:
A. R. EBI,
C. T. MOREY.